United States Patent [19]

Blaser

[11] 4,420,015
[45] Dec. 13, 1983

[54] INSTALLATION OF AN EXCESS PRESSURE VALVE IN A HERMETICALLY SEALED FLEXIBLE CONTAINER

[75] Inventor: Hans U. Blaser, Flurlingen, Switzerland

[73] Assignee: SIG-Schweizerische Industrie-Gesellschaft, Neuhausen am Rheinfall, Switzerland

[21] Appl. No.: 335,770

[22] Filed: Dec. 30, 1981

[30] Foreign Application Priority Data

Jan. 7, 1981 [CH] Switzerland .............................. 70/81

[51] Int. Cl.³ ............................................. F16K 15/16
[52] U.S. Cl. ..................................... 137/852; 220/209
[58] Field of Search ............... 137/852, 856, 857, 858, 137/855; 137/511, 843; 220/373, 374, 208, 209

[56] References Cited

U.S. PATENT DOCUMENTS

| 2,320,888 | 6/1943 | Reifenberg | 220/373 |
| 3,424,063 | 1/1969 | Norwood | 251/331 |
| 3,595,467 | 7/1971 | Goglio . | |
| 3,799,427 | 3/1974 | Goglio . | |
| 4,222,407 | 9/1980 | Ruschke et al. | 137/855 |

FOREIGN PATENT DOCUMENTS

| 1903048 | 5/1976 | Fed. Rep. of Germany . |
| 2603712 | 8/1977 | Fed. Rep. of Germany . |
| 2634226 | 2/1978 | Fed. Rep. of Germany . |
| 2360126 | 7/1979 | Fed. Rep. of Germany . |
| 2848834 | 5/1980 | Fed. Rep. of Germany . |
| 1045855 | 10/1962 | United Kingdom . |
| 1434660 | 12/1972 | United Kingdom . |
| 1487463 | 9/1977 | United Kingdom . |
| 1548244 | 7/1979 | United Kingdom . |
| 2047850A | 12/1980 | United Kingdom . |

Primary Examiner—Martin P. Schwadron
Assistant Examiner—Sheri Novack
Attorney, Agent, or Firm—Spencer & Frank

[57] ABSTRACT

In a safety valve for a hermetically sealed container, which valve includes a carrier plate having a lateral edge flange for fastening the carrier plate to the container and presenting a shallow recess having a base provided with a central opening, a flexible diaphragm inserted in the recess and covering the central opening, and a viscous sealing agent interposed between the base of the recess and the diaphragm, a clamping member is disposed in the recess and provided with pressing jaws positioned to clamp an edge region of the diaphragm against the base of the recess.

11 Claims, 3 Drawing Figures

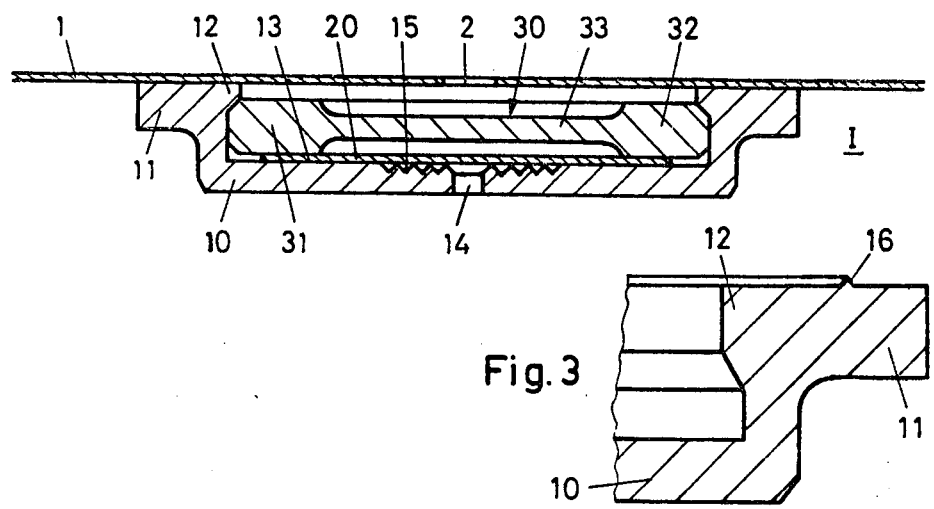
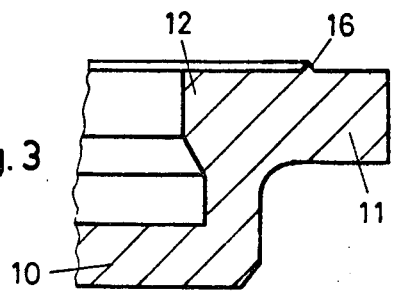
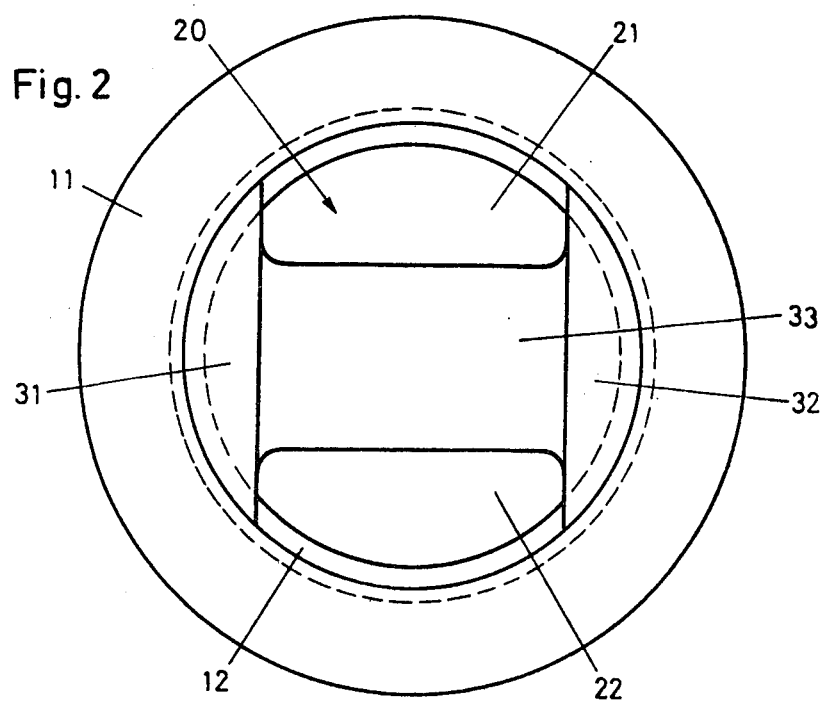

INSTALLATION OF AN EXCESS PRESSURE VALVE IN A HERMETICALLY SEALED FLEXIBLE CONTAINER

BACKGROUND OF THE INVENTION

The present invention relates to an excess pressure valve, or safety valve, for a hermetically sealed flexible container and to a method for installing such valve.

Valves of this type serve the purpose of discharging gases which are emitted by the material filling the container. Without such valves the bags would inflate in an undesirable manner so that, inter alia, stacking of such bags in stores would be made difficult, to say the least. Moreover, inflated bags are also difficult to pack in boxes holding large quantities thereof.

Various forms of such excess pressure valves are known. The valve disclosed in U.S. Pat. No. 3,595,467 composed of a hollow body which is provided with a passage and is formed of a base member welded to the bag and a hollow member forming a cover. The cover has a centrally disposed projection with which a flexible resilient disc is pressed against the passage in the base member. When there is excess gas pressure in the container, the disc is lifted away from the base member at the opening and gas can flow through the passage to be discharged through the opening in the cover. One drawback of such a valve is that when the valve is manufactured the parts must be assembled in a centered manner. A circular opening must be cut in the container wall and the valve must be inserted there in a centered manner. Such precise alignment of various parts, where a distinction must be made between top and bottom on some parts, requires additional means on packaging machines which additionally raise the cost of manufacture of such bags.

U.S. Pat. No. 3,799,427 discloses an improved valve in which a conical abutment is placed in the region of the passage opening and a viscous intermediate layer is added between the valve member and valve seat. Although this provides a better distinction between the open and the closed positions of the valve, the above-mentioned drawbacks continue to exist.

German Auslegeschrift [Published Application] No. 2,603,712 proceeds on a different path. Here the circular elastic disc is supported along its edge as well as in its center at a point concentric therewith and is additionally clamped in along its edge. An annular recess is formed between the edge support and the concentric location and this recess is connected with openings in the surface of the base member by means of a plurality of channels through a projection on the base member. The cover and the disc each have an opening in their centers. Here again the same drawbacks can be noted.

In contradistinction thereto, German Auslegeschrift No. 2,634,226 discloses a valve having a simpler design. This valve includes an annular, elastic valve element which is seated in a groove of a central pin in a plate-shaped valve element and rests on two ribs which are concentric to the pin. The openings for entry of the gas are disposed in the region between the pin and the inner rib. The valve element is provided with a flange with which it is fastened to the container wall. The gas is discharged through an opening in the container wall. Here again, the manufacture of the valve member involves additional work in that the elastic valve element must be inserted into the groove of the pin. Moreover, the arrangement of the sealing elements results in a complicated and therefore expensive casting or injection molding and the plate-shaped valve element requires a considerable amount of material.

A less expensive arrangement is disclosed in German Auslegeschrift No. 2,848,834. This arrangement includes a flat valve base provided with an eccentrically disposed valve hole which is covered by a valve diaphragm. This diaphragm is pressed against the valve base by means of holders at both sides of the valve hole. Here again the individual parts must be assembled in a precise mutual alignment. Moreover, such a valve must be disposed at the exterior of the container so that there is the danger that it will tear off.

SUMMARY OF THE INVENTION

Accordingly it is an object of the present invention to provide a valve of the above described type which is inexpensive to manufacture with respect to the amount of material required and with respect to the precision required in its assembly and attachment at the bag.

The above and other objects are achieved, according to the present invention, in a safety valve for a hermetically sealed container, which valve includes a carrier plate having a lateral edge flange for fastening the carrier plate to the container and presenting a shallow recess having a base provided with a central opening, a flexible diaphragm inserted in the recess and covering the central opening, and a viscous sealing agent interposed between the base of the recess and the diaphragm, by the provision of a clamping member disposed in the recess and provided with pressing jaws positioned to clamp an edge region of the diaphragm against the base of the recess.

BRIEF DESCRIPTION OF THE DRAWING

FIG. 1 is a cross-sectional view of a preferred embodiment of a valve according to the invention.

FIG. 2 is a plan view of the valve of FIG. 1.

FIG. 3 is a cross-sectional view of the edge flange of FIG. 1 in enlarged scale.

DESCRIPTION OF THE PREFERRED EMBODIMENTS

The valve shown in FIGS. 1 and 2 is composed of a cup-shaped carrier plate 10 having an external edge flange 11, a radially inwardly directed edge bead 12 at the interior side wall of the recess in the carrier plate 10, and a base region 13. In the center of the base region 13 of the carrier plate 10 there is an opening 14 which is surrounded by, for example, concentric grooves 15. A diaphragm 20 rests on the base region 13.

A clamping member 30 composed of lateral pressing jaws 31 and 32 and a bar 33 connecting jaws 31 and 32 is disposed in the cup-shaped recess formed by plate 10 and is held in place by bead 12. As is shown in FIG. 1, the pressing jaws 31, 32 and the bar 33 are designed to be symmetrical with respect to a horizontal median plane so that the vertical center cross-section has the shape of a dumbbell. The two pressing jaws 31 and 32 rest on edge regions of the diaphragm 20.

The safety valve is fastened to a container wall 1 at the interior of the container, the wall 1 being provided with a hole 2.

The effect of the valve according to the present invention is very easy to understand. An excess pressure in the interior region I of the container extends into the central opening 14 and bulges out the diaphragm 20 in such a manner that it is pressed away from its support on the base region 13. In regions 21 and 22, shown in FIG. 2, the diaphragm 20 is not directly pressed against region 13 and can be pushed away from base region 13 as far as its edge so that the gas is able to escape. During discharge of the gas, the grooves 15 form a sort of labyrinth to collect dust-like particles from the container contents in such a manner that these particles cannot reach the regions 21 and 22 of the diaphragm where it would possibly reduce the sealing effect.

The valve according to the invention can be manufactured from a thermoplastic material in simple molds by an injection molding process. The bead 12 of the carrier plate 10 poses no manufacturing difficulties since the bead can have small dimensions and can thus easily be removed from a mold.

During assembly it is merely necessary that care be taken to position the carrier plate 10 in such a manner that its recess opens toward the container wall. The diaphragm 20 which is made of a sheet-like, soft plastic, such as, for example, a polyester film having a thickness of 0.035 mm, need not be inserted in a precisely centered manner and the clamping member 30 can be made to be self-centering in that its edges are tapered so that conventional tolerances suffice for the precision required in positioning it in the carrier plate.

A layer of a viscous sealing agent, such as silicone oil, is introduced between the base region 13 and the diaphragm 20. This assures a good seal between the diaphragm 20 and the base region 13 once the recess pressure in the container interior I has been reduced.

A circumferential attachment edge may be provided on the surface of the edge flange 11 to fasten the valve to the container wall 1 by application of wave energy. Ultrasound (US) energy, is used as the wave energy.

As is known from US-energy welding the welding seam can be made equal throughout when one part is provided with a rib of about 0.1 to 1.0 mm high which concentrates the wave energy into a small area. This rib 16 is shown in greater scale in FIG. 3. With the wave energy this rib 16 is at least partially molten by the wave energy and the material of this rib 16 bonds with the material of the container wall 1.

One preferred material for the container wall 1 and for the carrier plate 10 is polyethylene.

It will be understood that the above description of the present invention is susceptible to various modifications, changes and adaptations, and the same are intended to be comprehended within the meaning and range of equivalents of the appended claims.

What is claimed is:

1. In a safety valve for a hermetically sealed container, which valve includes a carrier plate having a lateral edge flange for fastening the carrier plate to the container and presenting a shallow recess having a base provided with an opening, a flexible diaphragm inserted in the recess and covering the opening, and a viscous sealing agent interposed between the base of the recess and the diaphragm, the improvement comprising a clamping member disposed in said recess and provided with pressing jaws positioned to clamp an edge region of said diaphragm against said base of said recess and a bar connecting said pressing jaws to form a unit therewith and having a lesser thickness than said pressing jaws.

2. A valve as defined in claim 1 wherein said clamping member has two said pressing jaws disposed diametrically opposite one another.

3. A valve as defined in claim 2 wherein said bar is connected with said pressing jaws at the center of said pressing jaws.

4. A valve as defined in claim 1 wherein said carrier plate is provided with an edge bead which projects toward the interior of said recess at the open edge portion of said recess.

5. A valve as defined in claim 4 wherein said pressing jaws are clamped in between said edge bead and said diaphragm.

6. A valve as defined in claim 1, 2, 3, 4, or 5 wherein said diaphragm has a thickness of between 0.02 and 0.05 mm and a circular outline.

7. A valve as defined in claim 1, 2, 3, 4 or 5 wherein said edge flange surrounds said recess and has an annular, bead-like form whose base is greater than its height, said flange serving for concentrating ultrasonic energy when said carrier plate is welded to the container.

8. A valve as defined in claim 1, 2, 3, 4 or 5 further comprising means disposed around said opening for separating particles which may be carried along in a gas stream when said valve is opened to effect pressure equalization.

9. A valve as defined in claim 8 wherein said means comprise a plurality of concentric grooves in said base.

10. Method for forming an assembly of the valve defined in claim 1 with the container, comprising: assembling said valve by inserting said diaphragm and said clamping member in said recesses and introducing said viscous sealing agent between said base and said diaphragm; providing a panel of material which can be shaped into a tube to form the container, has at least one layer of thermoplastic material, and is provided with a gas passage; placing said valve with said flange against said thermoplastic layer so that said valve is at least approximately centered on said gas passage; and welding said flange and said panel together by application of wave energy.

11. Method as defined in claim 10 wherein untrasound waves are used as the wave energy.

* * * * *